United States Patent Office 2,948,643
Patented Aug. 9, 1960

2,948,643

PROCESS AND COMPOSITIONS FOR PRODUCING ALUMINUM SURFACE CONVERSION COATINGS

George H. Pimbley, Inglewood, Calif., assignor to Turco Products, Inc., Los Angeles, Calif., a corporation of California No Drawing. Filed Jan. 22, 1958, Ser. No. 710,402

24 Claims. (Cl. 148—6.27)

This application is a continuation-in-part of my co-pending applications Serial No. 550,825, filed December 5, 1955, now Patent No. 2,868,679, granted January 13, 1959, and Serial No. 647,933, filed March 25, 1957, now Patent No. 2,898,250, granted August 4, 1959.

In the prior art many methods are known of producing chemical films on aluminum surfaces, some of which have been commercially advantageous and have been widely practiced for many years past. Among these are the formation of artificial oxide coatings by means of electric current in chemical baths, the immersion of clean aluminum surfaces in alkaline baths containing chromate compounds whereby oxide type coatings are produced, the formation of phosphate coatings employing a phosphate ion as an essential element, e.g., in the form of an acid phosphate, and immersion in acidic baths containing an acid material other than the phosphate ion, together with other components, which baths attack aluminum and are effective to form a fixed integral film upon the surface of the aluminum object. It is the latter class of compositions to which the present invention belongs. A brief description of this category of chemical coatings on aluminum is given below.

When an object having a surface of aluminum, or of any alloy in which aluminum predominates, is cleaned free of grease and other surface soil, and then immersed in or otherwise contacted with a solution containing anions of an acid which attacks aluminum, such as hydrofluoric acid, together with dichromate and hydrogen ions, a chemical reaction occurs which results in a fixed, integral film upon the aluminum surface. The precise nature of this reaction, and of the resulting film is not known. Probably some of the aluminum is dissolved, bringing about an increase of pH at the interface between the aluminum surface and bath liquid, and formation of chromium and aluminum fluorides, oxides and hydroxides. The coating that results is probably a gel-like complex, containing some or all of these substances in an unknown state of chemical combination and physical structure. Generally, these coatings are thin, smooth, non-crystalline, relatively adherent and flexible, moderately lustrous, and of light yellow color with more or less red and greenish iridescence. The exact shade of color and degree of lustre differ greatly, according to which alloy of aluminum is being processed and according to the details of the processing procedure.

Chemical conversion coatings of the kind described, as known in the prior art, have been found sufficiently advantageous to warrant increasing use by airplane manufacturers and other industrial fabricators of aluminum. The procedures for application of such coatings have certain attractive features, including simplicity, low processing temperatures, brief contact time and feasibility of spray application.

However, the coatings and procedures of the prior art possess serious faults, which the present invention seeks to avoid. Among these faults is that of insufficient corrosion resistance to meet present day exacting requirements of military aircraft intended to be flown over salt-laden ocean atmospheres. Another is lack of adherence of the coating immediately after work pieces are lifted from processing tanks, fresh coatings having been subjected to streaking and smearing when the coated object is handled shortly after processing. This is inconvenient under heavy shop production schedules, and is a prevalent cause of defective work, rejects, and low production rate. Another drawback of the prior art has been that when the processing has been so adjusted as to temperatures, concentrations, and contact time as to produce deep solid coloring, desirable for ornamentation, the coatings have been lacking in requisite degree of corrosion resistance. Attainment of desirable color has been attended with tendency to early pitting and excessive corrosion under service conditions. Other defects have been difficulty of process control, erratic performance, early exhaustion of processing baths, and excessive variation of color, general appearance and character of performance between various alloys of aluminum.

My above-noted copending application Serial No. 550,825 discloses compositions and baths for producing improved colored conversion coatings on aluminum and its alloys, containing (1) one or more than one of the following ions: beryllium, magnesium, calcium, strontium, barium, or lithium cation; (2) one or more than one of the following ions: an anion which attacks aluminum such as chlorine, bromine, iodine or fluorine, preferably the latter; (3) preferably also an anion containing hexavalent chromium, and (4) preferably also an anion containing molybdenum or tungsten or both.

In many instances it is also desirable to produce a colorless or almost colorless conversion coating without impairing the other properties of the coating, for example, its corrosion resistance, smear-proofness and uniformity. It is known in the art to treat a conversion coating formed on aluminum, with hot water to remove or leach out of the film the yellow coloration in the coating following treatment in the conversion coating bath. While this hot water treatment reduces to some degree the color of the film or coating, the latter still retains more or less iridescence mostly in the nature of red, green and blue coloration, and the operation is inconvenient and time-consuming.

Further, where the coating is quite firmly fixed, such removal of the yellow color in the above noted manner is often difficult to achieve, particularly with certain aluminum alloys. Moreover, to obtain a coating of maximum corrosion resistance, it is necessary to prolong the time of treatment in the conversion coating bath to obtain a thicker coating, and the thicker the coating, the more difficult it is to remove the yellow coloration by the above noted treatment with hot water.

My above mentioned copending application Serial No. 647,933, discloses compositions and baths for obtaining improved colorless conversion coatings on aluminum and its alloys, by use of certain types of carbon-nitrogen compounds such as thiourea and thiocyanates.

One object of the invention is to increase the resistance of aluminum and aluminum alloy surfaces to corrosion, even under adverse conditions such as exposure to salt laden sea air, chemical fumes and solutions, and the like.

Another object is to provide aluminum and aluminum alloy surfaces with improved resistant coatings which are unusually flexible and adherent under conditions of stress.

A further object is to provide coatings for aluminum and its alloys which are effective to greatly improve the bonding of paints and other organics to the aluminum surfaces.

Yet another object is to provide means of ornamentation or an ornamental coating for aluminum and aluminum alloy surfaces.

A still further object of the invention is to produce colored or substantially colorless coatings or films on aluminum surfaces.

Another object is the provision of colored or substantially colorless aluminum conversion coatings having good corrosion resistance.

Yet another object is to produce such colored or substantially colorless aluminum conversion coatings, employing the same composition for both purposes, but simply varying the conditions of treatment to obtain either the colored or colorless coating, as desired.

A still further object of the invention is to provide unique versatile compositions, and a simple, highly effective process, to accomplish the above objects.

I have now discovered that by entirely replacing the group II-A cations beryllium, magnesium, calcium, strontium or barium, or the lithium, of the compositions of my above copending application Serial No. 550,825 with cations of group II-B of the periodic table, namely, zinc, cadmium and mercury, I can obtain aluminum conversion coatings characterized by possessing good corrosion resistance, being quickly formed and fixed, resistant to smearing, and of uniform color. Of particular significance, I have discovered that simply by changing the pH of the solution formed employing the novel compositions of the invention containing the above noted elements or cations of group II-B, in place of the above mentioned group II-A cations, I can obtain either strong, bright yellow conversion films on an aluminum object, or bright substantially colorless films, without sacrificing any of the aforementioned other advantageous properties of the conversion coating. Hence, the invention provides a single versatile composition eminently suited for production of colored or colorless conversion coatings, depending on the manipulation of the treating bath.

With respect to all of the above noted characteristics and advantages and with respect to paint and organic coat bonding, the coatings produced with baths containing cations of the above metals of group II-B are all much superior to those from prior art baths containing only sodium, potassium or ammonium as cations, and in the absence of the above group II-B cations of the invention. Further, the coatings made with baths containing cations selected from the above group II-B elements are much more uniform from piece to piece, and from one alloy to another than in the prior art.

With regard to comparison between the above noted elements within group II-B, the best results are obtained with zinc as the cation, with cadmium nearly as good. It has been observed that the yellow colored conversion coatings employing zinc or cadmium as cations are at least equal to and in some instances even better than the conversion coatings formed employing the group II-A cations of my above application Serial No. 550,825. As to formation of the colorless type conversion coating, zinc and cadmium cations also produce superior conversion coatings over those of the prior art and at least comparable to those produced employing the carbon-nitrogen compounds described in my above application Serial No. 647,933. In the case of both the colored and colorless conversion coatings, zinc and cadmium produce coatings having markedly superior corrosion resistance, in some instances withstanding salt spray tests for periods of time ranging from 500 to 600 hours. The mercury cation produces acceptable yellow conversion coatings having a satisfactory measure of corrosion resistance, but the performance of mercury cation in producing colorless coatings is inferior to that of zinc and cadmium.

The solutions of the invention preferably also contain an anion containing hexavalent chromium. Such anion appears to function in conjunction with the group II-B cation as well as with the other ions in the solution, to confer greater corrosion resistance on the resulting coating and also is believed to cause the yellow coloration of the coating at a certain pH of the treating solution as described more fully hereinafter. When anions containing hexavalent chromium are present in the solution, the source material for said chromium may be a material such as chromium trioxide or a chromate or dichromate such as the sodium or potassium chromate or dichromate. Conveniently, both the group II-B element cations and the hexavalent chromium anion can be furnished together and in the proper proportions to each other by employing a source material containing both the group II-B element and hexavalent chromium. An example of such a material is zinc chromate.

In the preferred practice of my invention an aqueous solution is first prepared containing in suitable proportions the cations of the group II-B elements and the hexavalent chromium anion, together with hydrogen ions and suitable proportions of an anion which effectively attacks or corrodes aluminum such as anions containing fluorine, chlorine, bromine or iodine. The preferred anion for this purpose is the fluorine-containing ion as this type is the most effective and convenient. The anions containing chlorine, bromine and iodine are also effective and useful for the attack on the aluminum surface, but in a lesser degree and by the use of higher processing temperatures and longer period of contact. The color of the colored coatings produced with the aid of these alternate type aluminum attacking anions tends to be less bright and golden than with fluorine-containing ions. The processing solution thus prepared is contacted with the clean aluminum surfaces by usual methods of application, such as spraying, immersion, brushing, swabbing, etc. under suitable conditions of temperature and length of time of contact to produce the desired improved surface conversion coating.

It is difficult as a practical matter to define a suitable processing solution in terms of concentrations of each of the ions contained therein for producing either colored or colorless conversion coatings, since the exact degree of ionization for each compound under all of the varying conditions cannot be precisely ascertained. I have found, however, that for providing satisfactory processing solutions according to the invention, the amount in grams per liter of the group II-B cations, hexavalent chromium and aluminum attacking anion, preferably fluorine, should be within ceertain ranges of concentration set forth below for producing best results. Further, especially successful operating solutions can be produced if the proportion of the fluorine to the hexavalent chromium falls within a certain range as noted below. The proportions of group II-B cation present in the bath in relation to the amounts of hexavalent chromium anion and halogen ion, e.g. fluorine-containing ion, present is of minor importance as long as there is present a substantial proportion of such cations and as long as the amount is not highly excessive.

The group II-B cations may be introduced by means of commonly available commercial products, such as the oxides, halides and nitrates of zinc, cadmium, or mercury. When the oxides are used, it is convenient to facilitate solution by simultaneous addition to the bath of a suitable amount of nitric acid. In the case of the preferred cation, zinc, there are available commercial fluorides and silicofluorides, by which both the zinc and fluorine containing ions may be simultaneously supplied.

However, other compounds of the group II-B elements can also be employed, such as the chromates, e.g. zinc chromate, mentioned above. In other words, there are many possible combinations of commonly available commercial products that may be employed successfully for preparation of baths in the practice of the invention, provided that the requisite cations and anions are present in suitable proportions, as set forth below.

Generally I have found that the amount of group II-B cation employed should be in the range of about 0.5 to about 8.0 grams per liter of processing solution, depending on the particular cation employed, based on the equivalent amounts of the group II-B elements present in their elemental or ionic form. In parallel types of formulations, it is ordinarily preferred to use somewhat greater amounts of cadmium cation than zinc, because of the difference in the atomic weights. Ordinarily, smaller amounts of mercury cation in the lower portion of the above range are employed because of the limited solubilities of mercury compounds in the type of solution employed in the invention. Nevertheless, even though present in relatively small proportion, the mercury cation performs definitely beneficial functions, particularly in fixing the conversion film so as to make it non-smearing.

Considerable latitude is provided as to the range of concentration of hexavalent chromium compound employed. I have found that a suitable working concentration of hexavalent chromium for purposes of the invention ranges between about 0.5 and about 9.0 grams per liter of processing solution based on the equivalent weight of chromium present in its elemental or ionic form.

Concerning the amounts of source material for the aluminum attacking, e.g., fluorine-containing ions preferably used along with the hexavalent chromium compound in the bath, the amounts of such material may also be varied to produce the desired results. However, here consideration should be given to the ratio of the amounts of combined fluorine and of combined hexavalent chromium with respect to each other. It is believed that the operation of the process of the invention involves release of fluorine-containing ions, which serve to attack the aluminum surface as a part of the coating action. It is thus necessary to have present enough source material to supply an adequate proportion of such ions. On the other hand, a proportion of fluorine-containing substances greatly in excess of that required for proper coating action will cause excessive attack on the aluminum and impair the anti-corrosion value of the coating. In view of lack of exact knowledge of the chemical reactions that occur in the coating process, the amount of compound containing the aluminum attacking anion, preferably fluorine-containing compound, to be introduced into every type of processing solution that may be successfully used in the practice of this invention cannot be precisely fixed as a practical matter because of the wide variations in conditions thus encountered. However, I have experienced highly satisfactory results with solutions in which the ratio of hexavalent chromium to fluorine has a range between about 0.7:1 and about 2.5:1 based on the equivalent weights of hexavalent chromium and fluorine either in elemental or ionic form in the solution.

The immediately foregoing range of ratios permits use of a variety of source materials for fluorine-containing ions. Many fluorine compounds can be successfully used as the source of said ions, including HF, NaF, $NH_4HF_2$, $HBF_4$, $NaBF_4$, $NH_4BF_4$, $ZnSiF_6$ and $Na_2SiF_6$. These compounds vary in ionization characteristics, and hence, they are used in varying proportions, depending upon the particular compound selected. I have found that the more simple fluorides, such as NaF, should be present in such proportion that the ratio of hexavalent chromium to fluorine approaches the 2.5 end of the above range. The more complex fluorine compounds, such as $NaBF_4$, may be satisfactorily used in larger quantities, so that the ratio of hexavalent chromium to fluorine approaches the 0.7 limit of the above range. If desired, as previously noted, the source of halogen-containing anion, e.g., fluorine-containing anion, and of the group II–B elements can be combined, as for example, by using zinc or cadmium silicofluoride.

When it is desired to employ aluminum-attacking substances other than those containing fluorine, the same general considerations obtain as to the proportions between such substances and the hexavalent chromium. Thus, when chlorine-containing substances are used, the range of the ratio Cr(VI):Cl may be about the same as for fluorine, i.e., about 0.7:1 to about 2.5:1. Because of the higher atomic weights of bromine and iodine, and the more sluggish action in processing baths of this invention, as compared with fluorine, it is feasible to use larger amounts of Br and I, so that the value of the ratio Cr(VI):Br or I will be smaller. Thus, a suitable range for Cr(VI):Br is about 0.5:1 to about 1.7:1, and a suitable range for Cr(VI):I is about 0.3:1 to about 1.4:1.

It is to be understood that the proportions and ranges given above are not critical and that results nearly as satisfactory may be obtained outside these limits, but they are the proportions and ranges I prefer:

I have found that a satisfactory processing solution should most desirably possess a concentration of hydrogen ions such that the pH of the solution falls within the overall range of about 1.3 to about 2.7, with the colored conversion coatings being obtained in the lower portion of this pH range, and the colorless conversion coatings obtained in the higher portion of such pH range. Thus, when it is desired to produce a colored, e.g., a yellow, conversion coating the pH of the solution should be maintained between about 1.3 and about 2.2, and for production of colorless conversion coatings, the pH should be maintained in the range of about 2.3 to about 2.7. Various acidic materials such as nitric acid, $H_2SO_4$, boric acid and acid salts can also be employed provided the particular acidic material utilized does not produce excessive attack on the aluminum nor excessive insoluble material or sludge in the processing solution. However, acidic materials which form a surface film by combination of the aluminum with such acidic materials, e.g., phosphoric acid or acid salts thereof, are not suitable, and are intended to be excluded from my compositions.

The chemicals for make-up of the bath may be introduced in any convenient form such as powders or liquid solutions; separately, or as compounded products. Usually it is most convenient to employ the dry materials as a compounded, powder product, and to introduce the nitric acid, or other liquids separately. Hence, the above described novel compositions in the form of mixtures in dry powdered form, as well as the solutions prepared therewith, are features of this invention.

The dry mixtures of the invention containing a compound including a group II–B element together with a compound containing hexavalent chromium, should preferably contain from about 5.0 to 30.0% of the group II–B element by weight of the composition and about 5.0 to 35.0% by weight of the hexavalent chromium. The halogen-containing, e.g., fluorine-containing compound, should be present in an amount such as to provide about 5.0 to 25.0% by weight of the element fluorine. When the group II–B element, the hexavalent chromium and halogen are present in the dry mixture in the aforementioned range of proportions, on addition of such dry mixture to water in an amount of about 1.0 to 4.0 ounces per gallon for producing the processing solution, there will be formed in the solution the group II–B cations and the hexavalent chromium anion within the range of proportions on the basis of grams per liter of solution, previously noted as being the preferred concentrations of these elements and a ratio of hexavalent chromium to fluorine in the above noted range. Where the acidic material can be a solid such as boric acid powder or certain acid salts, such as sodium bisulfate, these materials may also be incorporated in the dry mixture containing compounds including the group II–B element and hexavalent chromium, in a proportion of 3.0 to 10.0% by weight of the composition so as to produce a pH within the desired portion of the overall pH range of the processing solutions noted above. Again, it is to be understood that while the above ranges are preferred, satisfactory results may also be obtained outside these ranges.

A stainless steel vessel should be used for the bath, or some equally resistant vessel that will neither be attacked by the bath, nor have any contaminating effect on the bath. The ingredients for the bath are first mixed cold and the pH of the solution is then ascertained. If outside of the best operating range of 1.3 to 2.7, the pH can be brought within that range by additions of a suitable acid such as nitric, if the pH is too high, or by a suitable alkaline substance such as ammonium hydroxide if the pH is too low.

The aluminum surfaces to be treated in the solutions of the invention should be free from grease and other surface soils. A mild alkaline cleaning bath, e.g., one containing alkali metal carbonates, safe for aluminum, at a concentration of 6 to 8 oz. per gallon, is recommended for this purpose, at 170°–180° F.

End results frequently will be improved if surface oxide coating is removed, after alkaline cleaning, by pretreatment in a suitable acid type deoxidizing agent, e.g., mixtures of sulfuric, chromic and hydrofluoric acids. The work should be thoroughly rinsed after each precleaning and deoxidizing operation prior to treatment in the solution of the invention.

The clean aluminum surfaces may be treated by dipping the objects into the processing solutions hereof. Operating temperature ranges of about 75°–95° F. and immersion time of about 3–5 minutes are recommended. These conditions should be regulated according to the nature of the coating being produced. Thin, bright, uniform coatings are best for corrosion resistance and paint adhesion. If the coating is dull, powdery or chalky, then the temperature or contact time, or both, should be diminished.

After its removal from the conversion coating bath, the work is rinsed in water. Where a colored coating is desired, the coating will be of stronger color if the work is allowed to remain suspended in the air for 30 to 60 seconds before rinsing.

The final step is the dry-off, which may be accomplished by the usual methods, e.g., treatment of the coated objects in a dry-off oven.

The above recommendations pertain to dipping application. However, the same baths prepared as above, may also be used for spraying, with the same kind of surface preparation of the aluminum object. For spraying, the solution temperature should be about 90°–100° F., and the time of spray contact should be about 1–2 minutes. The same bath may also be used for brushing and swabbing applications. If desired, it may be thickened for this type of application by means of bentonite clay, so that the solution will not run off vertical surfaces.

As a means of routine control, a sample of the bath is withdrawn from time to time during operation, and the hexavalent chromium content ascertained, expressed as grams per liter, by usual methods of analysis. It will be found that the Cr (VI) content diminishes as the operation proceeds on a long succession of work pieces, and this periodical determination of Cr (VI) content serves as a convenient criterion as to need for replenishment of the bath. I have found that the various substances in the processing baths used in practice of this invention are ordinarily consumed in about equal proportions. Therefore, a replenishment that will restore the hexavalent chromium to its original content, serves as a criterion as to the amount of replenishment required for the other constituents of the bath. The depleted Cr (VI) is simply restored and then other materials are added in corresponding amounts to replenish these other components. This procedure is most convenient if the dry chemicals have all been added as one mixed product, since an addition of the mixed product sufficient to restore the depleted Cr (VI) will automatically replenish all other constituents in corresponding degree. Acid should be added also, if required, so as to maintain the pH within the above noted range.

I have found that baths operated in accordance with this invention are free from objectionable deposits of solid sludge on the work, or on bottom of the tanks. The operation proceeds smoothly, with little or no waste of chemicals, throughout application to a large number of work pieces in succession.

If desired, particularly where colorless conversion coatings are desired, there may also be incorporated in the conversion coating bath of the invention, an agent of the type described in my copending application Serial No. 647,933, e.g., thiourea, to further enhance production of such colorless conversion coatings. Also, if desired, where the invention process results in a yellow conversion coating, such residual coloration can be removed for production of colorless coatings by the after treatment procedure using the agents described in my above application Serial No. 647,933 or I may treat aluminum or aluminum alloy objects containing the yellow conversion coating with a dilute solution of chromic fluoride or chromic nitrate, said solution containing about 0.2 to 0.5% of such materials with the temperature ranging from about 75 to about 150° F. for a contact period of from about 2 to 10 minutes, followed by rinsing in cold water.

The following are examples of practice of the invention:

*Example 1*

A formulation consisting of the ingredients listed below was prepared.

| Ingredient | Percent by weight |
|---|---|
| $ZnSiF_6 \cdot 6H_2O$ | 48.2 |
| $CrO_3$ | 40.0 |
| Boric acid (powder) | 11.8 |
| Total | 100.0 |

The above mixture when kept in closed glass containers remains as a dry, yellow-tan colored, free-flowing powder, the chromium trioxide appearing as small pieces of dark red-brown color.

A processing bath was prepared by adding the above formulation to water in an amount of 1½ ounces per gallon of solution. The bath had a pH of 1.3 without requiring the addition of acid. Panels of 2024, 1100, and 3003 aluminum alloys treated in this solution produced strong, bright yellow conversion films with the bath at about room temperature, within 3 to 5 minutes contact time.

When the pH of this bath was raised to 2.5 by addition of ammonium hydroxide solution, bright colorless films were produced on the aforementioned types of aluminum panels.

Salt spray exposure tests of both the yellow and colorless conversion coatings on the above mentioned alloys showed excellent results with respect to corrosion resistance after 240 hours' exposure for the colorless films; and after 600 hours, for the yellow films.

*Example 2*

A solution was prepared by dissolving in water the following ingredients in the amounts indicated, per liter of solution.

| Ingredients: | Grams |
|---|---|
| $ZnCrO_4 \cdot 7H_2O$ | 8.8 |
| $Na_2SiF_6$ | 2.5 |
| Urea | 3.0 |
| Boric acid | 0.8 |
| Nitric acid (1.42 sp. gr.) | 10.5 |

Panels of 2024 aluminum alloy .04″ thick were treated in the above bath at pH of 1.7 and formed excellent yellow conversion coatings having high corrosion resistance on exposure to salt spray for a period of 240 hours.

When the pH of the solution was raised to 2.5, employing aluminum panels of the same type as noted above, good colorless conversion coatings were obtained which withstood salt spray tests of 168 hours.

Example 3

A solution was prepared by dissolving in water the following ingredients in the amounts indicated, per liter of solution.

Ingredients: Grams
- $Zn(C_2H_3O_2) \cdot 2H_2O$ —— 6.7
- $CrO_3$ —— 5.8
- $Na_2SiF_6$ —— 5.0
- Urea —— 6.0
- Boric acid —— 1.6
- Nitric acid, 1.42 sp. gr. —— 3.0

Panels of 2024 aluminum alloy of 0.4" thickness were treated in the above bath at pH of 2.5. Good looking colorless conversion coatings were formed, having good corrosion resistance as indicated by exposure to salt spray for a period of 144 hours.

An addition of 4.0 grams nitric acid (sp. gr. 1.42) was made to the one liter bath, bringing the pH down to 1.5. Panels of 2024 aluminum alloy were treated in the resulting solution, and on said panels were formed bright, strong yellow conversion films, having good corrosion resistance as indicated by exposure to salt spray for a period of 192 hours.

Example 4

A solution was prepared by dissolving in water the following ingredients in the amounts indicated per liter of solution.

Ingredients: Grams
- ZnO —— 4.32
- $CrO_3$ —— 5.36
- $Na_2SiF_6$ —— 5.48
- $HNO_3$ (1.42 sp. gr.) —— 8.50

Panels of 2024 aluminum alloy of .04" thickness were treated in the above bath at a pH of 1.5, and formed excellent yellow conversion coatings having high corrosion resistance as indicated by exposure to salt spray for a period of 500 hours. The pH of the bath was increased to 2.5 by addition of ammonium hydroxide, and aluminum panels of the above noted type were treated in this solution, forming excellent colorless conversion coatings having good salt spray resistance as indicated by successful exposure to salt spray for 192 hours.

Example 5

A solution was prepared by dissolving in water the following ingredients in the amounts indicated, per liter of solution.

Ingredients: Grams
- ZnO —— 4.3
- $CrO_3$ —— 5.4
- $Na_2SiF_6$ —— 5.5
- Urea —— 2.5
- Boric acid —— 0.8
- $HNO_3$ (sp. gr. 1.42) —— 10.3

2024 aluminum alloy panels of .04" thickness were treated in the above bath at pH of about 1.5, producing excellent yellow conversion coatings of good salt spray resistance.

Example 6

A solution was prepared by dissolving in water the following ingredients in the amounts indicated, per liter of solution.

Ingredients: Grams
- CdO —— 6.0
- $CrO_3$ —— 5.4
- $Na_2SiF_6$ —— 5.5
- Urea —— 2.5
- Boric acid —— 0.8
- $HNO_3$ (sp. gr. 1.42) —— 10.5

Panels of 2024 aluminum alloy of .04" thickness were treated in the above bath at a pH of 1.3 to 1.5, forming excellent yellow conversion coatings having excellent salt spray resistance as indicated by exposure to salt spray for a period of 700 hours.

Example 7

A solution was prepared by dissolving in water the following ingredients in the amounts indicated, per liter of solution.

Ingredients: Grams
- $HgBr_2$ —— 3.0
- $CrO_3$ —— 8.0
- $Na_2SiF_6$ —— 6.0
- Boric acid —— 1.0

Panels of 2024 aluminum alloy of .04" thickness were treated in the above bath at pH of 1.5. Brownish-yellow conversion coatings were thus formed, but were slightly blotchy and smeary in appearance. However, such coatings had good salt spray resistance.

Example 8

A solution was prepared by dissolving in water the following ingredients in the amounts indicated, per liter of solution.

Ingredients: Grams
- CdO —— 3.7
- $CrO_3$ —— 8.0
- HF acid (48% solution) —— 4.2

Panels of 2024 aluminum alloy of 0.04" thickness were treated in the above bath at pH 1.5. Bright, strong yellow conversion films were produced, having excellent salt spray resistance.

Example 9

A solution was prepared by dissolving in water the following ingredients in the amounts indicated, per liter of solution.

Ingredients: Grams
- $Hg(NO_3) \cdot H_2O$ —— 1.0
- $CrO_3$ —— 8.0
- HF acid (48% solution) —— 4.1

Panels of 2024 aluminum alloy, of 0.04" thickness were treated in the above bath at pH 1.3. Pale brownish-yellow bright films were produced, having good corrosion resistance as indicated by exposure to salt spray for a period of 240 hours.

Example 10

A solution was prepared by dissolving in water the following ingredients in the amounts indicated, per liter of solution.

Ingredients: Grams
- $HgBr_2$ —— 5.3
- $CrO_3$ —— 8.0
- $NH_4OH$ (sp. gr. 0.897) —— 0.2

Panels of 2024 aluminum alloy, of 0.04" thickness were treated in the above bath at pH—1.5. Pale yellow conversion films were produced, having fairly good salt spray resistance.

Example 11

A solution was prepared by dissolving in water the ingredients noted below in the amounts indicated per liter of solution.

Ingredients: Grams
- ZnO —— 4.3
- Commercial molybdic acid (85% molybdic acid and 15% ammonium molybdate) —— 6.0
- $Na_2SiF_6$ —— 5.5
- $HNO_3$ (sp. gr. 1.42) —— 9.9

Panels of 2024 aluminum alloy were treated in the above bath at pH of about 2.0. Pale yellow conversion coatings having a purplish iridescence, and having fair salt spray resistance were obtained.

The urea present in the compositions of Examples 2, 3, 5 and 6 is believed also to aid in improving the conversion coating, e.g., as regards corrosion resistance.

The instant invention accordingly provides compositions and procedure for readily forming colored or colorless conversion coatings on aluminum and its alloys, which are tough, tenacious, have excellent corrosion resistance, and are resistant to smearing.

The aluminum surfaces on which my invention can be applied include substantially pure aluminum and all of its ordinary commercial alloys. Examples of aluminum surfaces on which the invention has been successfully applied are as follows, the old and new alloy designations being those published in "Materials and Methods," September 1954, page 139. In the same publication the composition of each alloy is set forth. These examples are by way of illustration only, and are not intended to include all the types of aluminum surfaces upon which the invention may be useful.

| Old Designation | New Designation |
|---|---|
| 2-S | 1100 |
| 3-S | 3003 |
| 24-S-T | 2024 |
| 52-S | 5052 |
| 53-S | 6053 |
| 61-S | 6061 |
| 75-S | 7075 |

The various aluminum alloys provided with protective coatings in accordance with this invention are useful in the fabrication of airplanes, coach bodies, building structural parts, household utility appliances, and countless other industrial objects, all of which are thereby improved with respect to corrosion resistance, paint bonding, and appearance.

I may also employ as the source of fluorine-containing ion the following compounds. potassium titanium fluoride, sodium titanium fluoride, potassium zirconium fluoride, ammonium beryllium fluoride, ammonium cadmium fluoride, ammonium aluminum fluoride, ammonium chromium fluoride, potassium molybdenum fluoride, potassium rhenium fluoride, ammonium zirconium fluoride, potassium zirconium pentafluoride, sodium zirconium pentafluoride, potassium ferric fluoride, potassium zinc fluoride, ammonium titanium fluoride, potassium hafnium fluoride, potassium columbium fluoride, and potassium tantalum fluoride.

The term "consisting essentially of" as used in the definition of the ingredients present in the compositions claimed is intended to exclude the presence of other materials in such amounts as to interfere substantially with the properties and characteristics possessed by the composition set forth but to permit the presence of other materials in such amounts as not substantially to affect said properties and characteristics adversely.

While I have described particular embodiments of my invention for the purpose of illustration, it should be understood that various modifications and adaptations thereof may be made within the spirit of the invention as set forth in the appended claims.

I claim:

1. A process for applying a coating to surfaces of objects of aluminum and its alloys, which comprises treating said objects in an aqueous acidic bath consisting essentially of about 0.5 to about 8.0 grams per liter of a cation of the group consisting of zinc, cadmium and mercury, a minor effective amount of a halogen-containing anion, and an anion containing hexavalent chromium in an amount equivalent to between about 0.5 and about 9.0 grams per liter of chromium.

2. A process for applying a coating to surfaces of objects of aluminum and its alloys, which comprises treating said objects in an aqueous acidic bath consisting essentially of about 0.5 to about 8.0 grams per liter of a cation of the group consisting of zinc, cadimum and mercury, a fluorine-containing anion and an anion containing hexavalent chromium, the ratio of hexavalent chromium to fluorine being about 0.7:1 to about 2.5:1.

3. A process for applying a coating to surfaces of objects of aluminum and its alloys, which comprises treating said objects in an aqueous acidic bath consisting essentially of about 0.5 to about 8 grams per liter of zinc as cation, a fluorine-containing anion, and an anion containing hexavalent chromium, the ratio of hexavalent chromium to fluorine being about 0.7:1 to about 2.5:1, the pH of said bath being in the range of about 1.3 to about 2.7.

4. A process for applying a coating to surfaces of objects of aluminum and its alloys, which comprises treating said objects in an aqueous acidic bath consisting essentially of about 0.5 to about 8 grams per liter of cadmium as cation, a fluorine-containing anion, and an anion containing hexavalent chromium, the ratio of hexavalent chromium to fluorine being about 0.7:1 to about 2.5:1, the pH of said bath being in the range of about 1.3 to about 2.7.

5. A process for applying a coating to surfaces of objects of aluminum and its alloys, which comprises treating said objects in an aqueous acidic bath consisting essentially of about 0.5 to about 8 grams per liter of mercury as cation, a fluorine-containing anion, and an anion containing hexavalent chromium, the ratio of hexavalent chromium to fluorine being about 0.7:1 to about 2.5:1, the pH of said bath being in the range of about 1.3 to about 2.2.

6. A process for applying a coating to surfaces of objects of aluminum and its alloys, which comprises treating said objects in an aqueous acidic bath consisting essentially of about 0.5 to about 8 grams per liter of zinc as cation, a fluorine-containing anion, and an anion containing hexavalent chromium, the ratio of hexavalent chromium to fluorine being about 0.7:1 to about 2.5:1, the pH of said bath being in the range of about 2.3 to about 2.7.

7. An aqueous acid bath for applying a coating to surfaces of objects of aluminum and its alloys which consists essentially of a cation of the group consisting of zinc, cadmium and mercury, a fluorine-containing anion, and an ion containing hexavalent chromium, the ratio of hexavalent chromium to fluorine being about 0.7:1 to about 2.5:1.

8. An aqueous acid bath for applying a coating to surfaces of objects of aluminum and its alloys which consists essentially of about 0.5 to about 8.0 grams per liter of zinc as cation, a fluorine-contaniing anion, and an ion containing hexavalent chromium, the ratio of hexavalent chromium to fluorine being about 0.7:1 to about 2.5:1, the pH of said bath being in the range of about 1.3 to about 2.7.

9. An aqueous acid bath for applying a coating to surfaces of objects of aluminum and its alloys which consists essentiality of about 0.5 to about 8.0 grams per liter of cadmium as cation, a fluorine-containing anion, and an ion containing hexavalent chromium, the ratio of hexavalent chromium to fluorine being about 0.7:1 to about 2.5:1, the pH of said bath being in the range of about 1.3 to about 2.7.

10. A solid composition of matter for preparation of baths for coating objects of aluminum and its alloys, which comprises a mixture of compounds including in chemically combined form an element of the group consisting of zinc, cadmium and mercury, hexavalent chromium, and a halogen, said element being present in an amount of about 5.0% to 30%, said hexavalent chromium being present in an amount of about 5.0% to 35.0%, and said halogen being present in an amount of about 5.0% to 25.0%, based on the weight of the composition, said composition when added to water forming an ion containing said element, an ion containing hexavalent chromium, and a halogen-containing ion.

11. A solid composition of matter for preparation of baths for coating objects of aluminum and its alloys, which comprises a mixture of compounds including in chemically combined form the elements zinc, hexavalent chromium and fluorine, said composition when added to water forming ions containing said elements, said elements being present in an amount of about 5.0 to 30.0% by weight of zinc, about 5.0 to 35.0% by weight of hexavalent chromium and about 5.0 to 25.0% by weight of fluorine.

12. A solid composition of matter for preparation of baths for coating objects of aluminum and its alloys, which comprises a mixture of compounds including in chemically combined form the elements cadmium, hexavalent chromium and fluorine, said composition when added to said forming ions containing said elements, said elements being present in an amount of about 5.0 to 30.0% by weight of cadmium, about 5.0 to 35.0% by weight of hexavalent chromium and about 5.0 to 25.0% by weight of fluorine.

13. A solid composition of matter for preparation of baths for coating objects of aluminum and its alloys, which comprises a mixture of compounds consisting essentially of zinc silicofluoride, chromium trioxide and boric acid, the amount of zinc present in said composition being about 5.0% to 30.0%, the amount of hexavalent chromium present being about 5.0% to 35.0% and the amount of fluorine present being about 5.0% to 25.0%, based on the weight of the composition.

14. A process for applying a chemically bonded conversion coating to surfaces of objects of aluminum and its alloys which comprises treating said objects in an aqueous acidic bath consisting essentially of a cation of the group consisting of zinc, cadmium and mercury and a minor effective amount of a halogen-containing anion, the amount of said cation present being about 0.5 to about 8.0 grams per liter, the pH of said bath being in the range of about 1.3 to about 2.7.

15. In a solid composition of matter for preparation of baths for producing a chemically bonded coating on an aluminum article of the type having as essential ingredients thereof a mixture of compounds, including effective amounts of hexavalent chromium and a halogen, the improvement of a soluble compound in said composition, said last mentioned compound including an element of the group consisting of zinc, cadmium and mercury, said element being present in an amount of about 5.0% to 30.0% by weight of said composition.

16. In the composition of claim 15, wherein said halogen is fluorine.

17. A solid composition of matter for preparation of baths for coating objects of aluminum and its alloys which comprises a mixture of compounds consisting essentially of zinc oxide, chromium trioxide and sodium silicofluoride the amount of zinc present in said composition being about 5.0% to 30.0%, the amount of hexavalent chromium present being about 5.0% to 35.0% and the amount of fluorine present being about 5.0% to 25.0%, based on the weight of the composition.

18. A solid composition of matter for coating objects of aluminum and its alloys which comprises a mixture of compounds consisting essentially of cadmium oxide, chromium trioxide and sodium silicofluoride, the amount of cadmium present in said composition being about 5.0% to 30.0%, the amount of hexavalent chromium present being about 5.0% to 35.0% and the amount of fluorine present being about 5.0% to 25.0%, based on the weight of the composition.

19. A process for applying a chemically bonded conversion coating to surfaces of objects of aluminum and its alloys, which comprises treating said objects in an aqueous acidic bath consisting essentially of an acidic material of the group consisting of nitric acid, sulfuric acid, boric acid, hydrofluoric acid, chromic acid, and acid salts thereof, about 0.5 to about 8.0 grams per liter of a cation of the group consisting of zinc, cadmium and mercury, and a halogen-containing anion, the pH of said bath being in the range of about 1.3 to about 2.7.

20. A process for applying a chemically bonded conversion coating to surfaces of objects of aluminum and its alloys, which comprises treating said objects in an aqueous acidic bath consisting essentially of an acidic material of the group consisting of nitric acid, sulfuric acid, boric acid, hydrofluoric acid, chromic acid, and acid salts thereof, about 0.5 to about 8.0 grams per liter of zinc as cation, and a halogen containing anion, the pH of said bath being in the range of about 1.3 to about 2.7.

21. A process for applying a chemically bonded conversion coating to surfaces of objects of alumnium and its alloys, which comprises treating said objects in an aqueous acidic bath consisting essentially of an acidic material of the group consisting of nitric acid, sulfuric acid, boric acid, hydrofluoric acid, chromic acid, and acid salts thereof, about 0.5 to about 8.0 grams per liter of cadmium as cation, and a halogen-containing anion, the pH of said bath being in the range of about 1.3 to about 2.7.

22. A process for applying a chemically bonded conversion coating to surfaces of objects of aluminum and its alloys, which comprises treating said objects in an aqueous acidic bath consisting essentially of an acidic material of the group consisting of nitric acid, sulfuric acid, boric acid, hydrofluoric acid, chromic acid, and acid salts thereof, and about 0.5 to about 8.0 grams per liter of zinc as cation, and a fluorine-containing anion, the pH of said bath being in the range of about 1.3 to about 2.7.

23. A process for applying a chemically bonded conversion coating to surfaces of objects of aluminum and its alloys, which comprises treating said objects in an aqueous acidic bath consisting essentially of an acidic material of the group consisting of nitric acid, sulfuric acid, boric acid, hydrofluoric acid, chromic acid, and acid salts thereof, about 0.5 to about 8.0 grams per liter of cadmium as cation, and a fluorine-containing anion, the pH of said bath being in the range of about 1.3 to about 2.7.

24. An aqueous acid bath for applying a chemically bonded conversion coating to surfaces of objects of aluminum and its alloys which consists essentially of about 0.5 to about 8 grams per liter of a cation of the group consisting of zinc, cadmium and mercury, and a halogen-containing anion, the pH of said bath being in the range of 1.3 to about 2.7.

References Cited in the file of this patent

UNITED STATES PATENTS

| | | |
|---|---|---|
| 2,494,910 | Spruance | Jan. 17, 1950 |
| 2,500,673 | Gibson et al. | Mar. 14, 1950 |
| 2,580,773 | Heiman | Jan. 1, 1952 |